United States Patent [19]
Allen et al.

[11] Patent Number: 5,869,792
[45] Date of Patent: Feb. 9, 1999

[54] REACTIVE ACOUSTIC SILENCER

[75] Inventors: Donald L. Allen, Don Mills; Robert D. Stevens, Mississauga, both of Canada

[73] Assignee: Vibron Limited, Mississauga, Canada

[21] Appl. No.: 759,828

[22] Filed: Dec. 4, 1996

[30] Foreign Application Priority Data

Dec. 4, 1995 [CA] Canada .................................. 2164370

[51] Int. Cl.⁶ .................................................. E04F 17/04
[52] U.S. Cl. ............................................ 181/224; 181/250
[58] Field of Search ................... 181/224, 213, 181/214, 217, 218, 250, 251, 268, 273, 275, 276, 286, 292

[56] References Cited

U.S. PATENT DOCUMENTS

| | | | |
|---|---|---|---|
| 4,100,993 | 7/1978 | Feder | 181/213 |
| 4,150,732 | 4/1979 | Hoch et al. | 181/213 |
| 4,287,962 | 9/1981 | Ingard et al. | |
| 5,276,291 | 1/1994 | Norris | 181/224 |

FOREIGN PATENT DOCUMENTS

1160959  1/1984  Canada .

*Primary Examiner*—Khanh Dang
*Attorney, Agent, or Firm*—Barrigar & Moss

[57] ABSTRACT

An acoustic duct silencer is disclosed having opposed sidewall baffles which are disposed in a duct such that a cavity is defined between the baffles and the adjacent duct sidewalls, the space between the baffles bordering a passageway in the duct for the flow of a fluid medium therethrough. Each baffle features an array of generally parallel, spaced-apart elongate slots which substantially span the vertical or horizontal breadth of the baffles. The baffles preferably have a relatively large effective thickness so that the slots formed therein have a significant depth to them. In this manner, an integral array of resonators are provided having a significant slot or throat depth for the attenuation of low frequency sound.

17 Claims, 6 Drawing Sheets

REACTIVE ACOUSTIC SILENCER

FIELD OF THE INVENTION

The present invention relates to the field of acoustic duct silencers, and more particularly, to reactive-type acoustic duct silencers exhibiting good low frequency attenuation characteristics.

A duct silencer is a device inserted into a ventilation or exhaust duct to reduce noise propagation through the duct. Absorptive type silencers, which are the most common type for commercial and industrial uses, employ absorptive baffles which are disposed parallel to the flow of fluid. These baffles are comprised of a porous, acoustically absorptive fill.

There are a number of design restrictions associated with absorptive type silencers. First, the introduction of a baffle within the duct poses a restriction to the air flow and hence introduces a static pressure loss, $\Delta P_s$, to the system. This additional pressure must be overcome by the fan which forces air to flow through the duct system. The silencer static pressure loss increases with the velocity of air flowing through the silencer.

In order to effectively attenuate sound at low frequencies, which is characterized by long wavelengths, it is necessary to use large, bulky silencers, which severely restrict the air flow in the duct and therefore add a large static pressure loss to the system. The increased $\Delta P_s$ causes the fan, which drives the system, to work harder and consume more energy in order to deliver the same quantity of ventilation flow.

Another limitation associated with absorptive silencers is that since they are filled with a particulate material, such material may break down over time and be carried away as particles by the fluid flowing through the silencer. In certain applications, such as ventilation systems for hospitals, drug manufacturing facilities or other places where "clean rooms" are desired, it is important that no dust or other particles be entrained by the ventilation air flow.

In order to overcome the above problems, reactive type silencers have been developed which are based on the principle of Helmholtz resonators. These types of resonators are discussed in a number of references, including Soderman, Paul, T., "A Study of Resonant Cavity and Fibreglass Filled Parallel Baffles as Duct Silencers", NASA Technical Report 81-A-2. Aeromechanics Research and Technology Laboratories, Moffett Field, Calif., 1982. One type of reactive silencer based on the principle of Helmholtz resonators is disclosed in U.S. Pat. No. 4,287,962, issued Sep. 8, 1981 and assigned to Industrial Acoustics Company, Inc. This type of silencer employs a pair of opposed facing panels, each of which is spaced apart from its duct sidewall so as to form a cavity therebetween. The facing panel is perforated with small holes at regularly spaced intervals for allowing noise propagating through the duct to communicate with the cavity. The mean flow of fluid through the silencer interacts with the perforations due to an acoustically induced deflection or switching of some of the mean flow in and out of the perforations, which requires energy taken from the sound field. One problem with using perforated panels, which the disclosure sought to overcome, was the self noise generated by the silencer itself. It was found through experimentation that the silencer self-noise or whistling could be reduced by employing holes which collectively yield a panel porosity in the range of 2–10%. In addition, the silencer could be tuned by varying the diameter of the holes within this range.

The above-described silencer works well for low frequencies. However, it is difficult to attenuate higher sound frequencies with such a device. For one thing, it is not possible to attach a thin layer of absorptive material to either side of the panel to attenuate high frequencies as this may counteract the attenuation effect of the Helmholtz resonator. It is possible to incorporate additional reactive silencers within a larger reactive silencer disposed in the duct to boost the attenuated bandwidth, but this solution can increase the static pressure loss of the silencer.

SUMMARY OF THE INVENTION

The present invention attempts to overcome some of the limitations of the prior art.

The silencer of the invention includes opposed sidewall baffles which are disposed in a duct such that a cavity is defined between the baffle and the adjacent duct sidewall, the space between the baffles bordering a passageway in the duct for the flow of a fluid medium therethrough. Each baffle features an array of generally parallel, spaced-apart elongate slots which substantially span the vertical or horizontal breadth of the baffles. The baffles preferably have a relatively large effective thickness so that the slots formed therein have a significant depth to them. In this manner, an integral array of resonators having a significant slot or throat depth is provided for the attenuation of low frequency sound.

According to one aspect of the invention, an acoustic silencer for use in a duct having opposed sidewalls is provided. The silencer includes a pair of opposed sidewall baffles, each baffle being located adjacent to one of the duct sidewalls. The baffles each have a planar center wall portion disposed generally parallel to and spaced from the duct sidewall adjacent thereto, and each baffle includes end portions for connection to the adjacent sidewall such that a cavity is defined between the center wall portion and the adjacent duct sidewall. The space between opposed baffles comprises a passageway in the duct for the flow of a fluid medium therethrough. The center wall portion of each baffle includes a plurality of generally parallel and substantially uniformly spaced-apart slots which substantially span the horizontal or vertical breadth of the center wall portion. The slots collectively provide a porosity in the range of about 1 to 10 percent of the total area of the center wall portion.

In the preferred embodiment, the center wall portion of each baffle is formed from a linear array of distinct acoustic panels disposed side by side in close proximity to one another yet spaced apart so as to define the above-described slots. These acoustic panels are preferably U or C-channelled members which allow for the obtainment of a significant slot depth yet do not diminish the effective volume of the cavity formed by the baffle. Retaining means are provided for retaining the acoustic panels in fixed spatial relationship to one another and to the duct sidewalls. The preferred embodiment was tested and found to have low frequency sound attenuation characteristics comparable or superior to known absorptive media, but at a much lower static pressure loss, thereby resulting in significant energy savings over the known absorptive type silencers.

According to another aspect of the invention, a glass fiber board or other acoustic absorptive media is applied to the inner or outer face of the baffle. In this manner, the silencer can readily attenuate high frequencies, as well as low frequencies. It was found, however, that the type and placement of the absorptive media significantly affected the low frequency sound attenuation performance of the silencer in ways which could not be predicted based on current theoretical models of silencers.

According to yet another aspect of the invention, a plurality of silencers, each tuned to a different resonating frequency, are connected together serially. This provides a sound filter having a relatively high and flat attenuation level over a relatively large low frequency bandwidth.

BRIEF DESCRIPTION OF THE DRAWINGS

The invention will be more fully understood with reference to the following detailed description and accompanying drawings, wherein.

DESCRIPTION OF THE PREFERRED EMBODIMENTS

Figure 1:
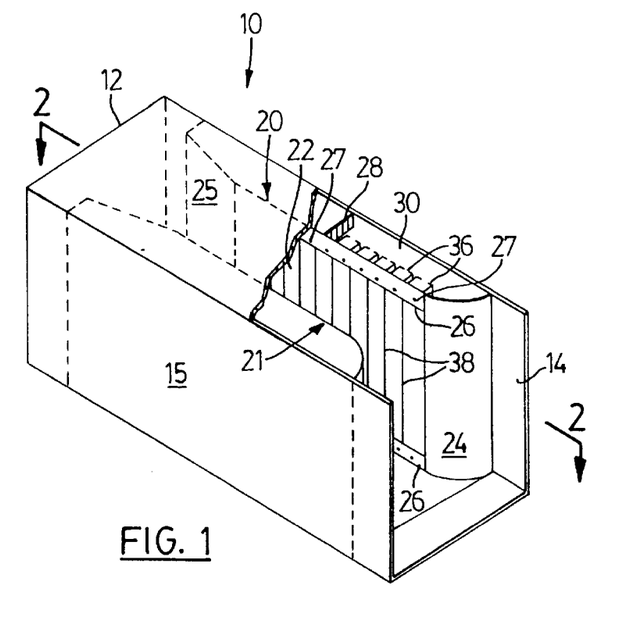
FIG. 1 is a cutaway perspective view of a silencer, taken from above, according to a preferred embodiment of the invention.
Figure 2:
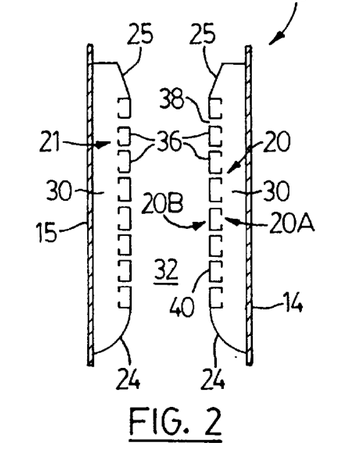
FIG. 2 is a cross sectional view of the silencer taken along lines 2—2 of FIG. 1.
Figures 3A, 3B, 4, 5:
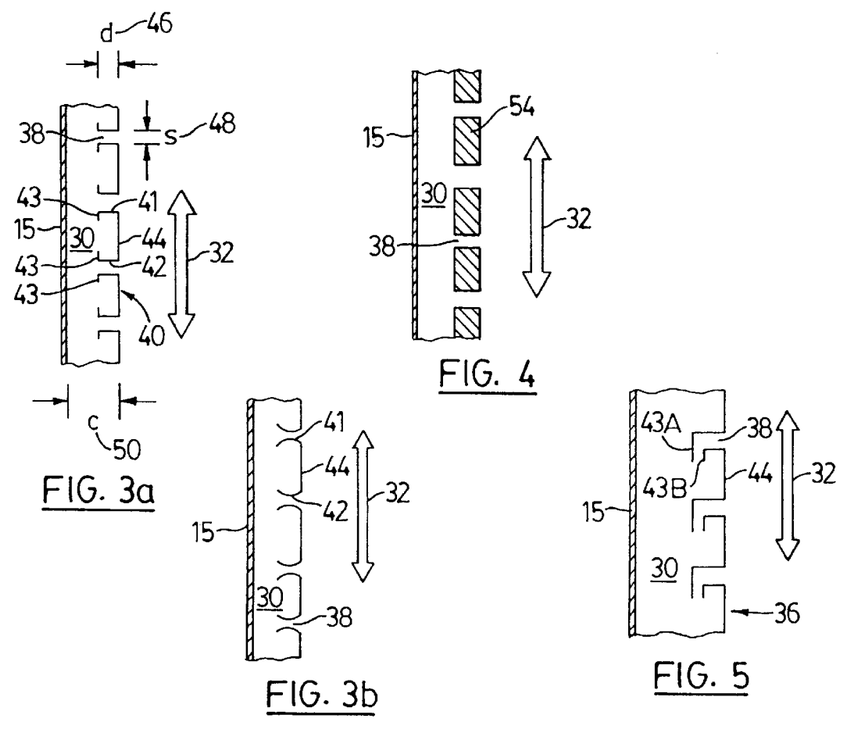
FIG. 3a is a detailed, partial cross-sectional view of the preferred silencer (similar to the view of FIG. 2) illustrating a preferred form of acoustic panels employed therein.
FIG. 3b is a detailed, partial cross-sectional view of an alternative embodiment of the silencer illustrating an alternative form of acoustic panel.
FIG. 4 is a detailed, partial cross-sectional view of an alternative embodiment of the silencer illustrating a second alternative form of acoustic panel.
FIG. 5 is a detailed, partial cross-sectional view of an alternative embodiment of the silencer illustrating a third alternative form of acoustic panel.

A reactive acoustic silencer constructed according to the preferred embodiment of the invention is shown in FIGS. 1–3(a, b), the silencer being generally designated by reference numeral 10. The silencer 10 is shown installed within a ventilation or exhaust duct 12, typically of rectangular or circular (not shown) cross-section, having opposed, upstanding side walls 14 and 15. The duct walls are impervious to the flow of fluid therethrough. The duct may be constructed out of a variety of materials, but the typical commercial grade duct is made of 20 or 22 gauge (0.88 or 0.073 mm) sheet metal and the invention contemplates installing the silencer in such a duct.

The silencer includes at least one pair of opposed baffles 20 and 21, each of which is disposed adjacent to one of the side walls 14 and 15 (as shown in FIGS. 1 and 2) yet spaced therefrom. The space between the opposed baffles 20 and 21 constitutes a passageway 32 through the duct for the flow of a fluid medium, the direction of flow not being of particular significance to the operation of the silencer. It is also possible to employ two pairs of opposed baffles (not shown) such that the passageway 32 is bordered on all sides by the baffles.

For ease of reference, the structure of one baffle will be described in greater detail, it being understood that the baffles are virtually identical, save for possible variations in dimensions, as described in greater detail below.

The baffle 20 has an inner side or face 20A which faces the adjacent side wall 14 and an outer side or face 20B which defines or borders the passageway 32. The outer face 20B of baffle 20 comprises a flat, center wall portion 22 which occupies the majority of the area of the outer face 20B. The baffle 20 includes end portions 24 and 25 which are sealingly connected to the center wall portion 22 and, when installed in the duct, the peripheries of the end portions are sealingly connected by known methods to the adjacent duct sidewall. Thus, a cavity 30 is defined between baffle 20 and adjacent duct sidewall 14. In the preferred embodiment, the center wall portion 22 is orientated generally parallel to the duct sidewall 14 adjacent thereto. In addition, the baffle is preferably substantially as tall as the adjacent duct sidewall 14 such that air flowing through the passageway 32 does not directly abut the duct sidewall 14 adjacent to the facing 20.

Each baffle includes a plurality of very elongate air gaps or slots 38 therein for enabling air flowing through passageway 32 to acoustically communicate with the cavity 30. The elongate slots 38 substantially span the transverse breadth of the baffle and are substantially uniformly spaced apart. In the preferred embodiment, the baffle 20 is composed of a linear array of individual acoustic panels 36 which are disposed in a side by side arrangement in close proximity to one another (as shown best in FIG. 2) such that the aforementioned elongate slots 38 are formed between adjacent panels 36. In this embodiment, retaining means or bars 26 retain the acoustic panels of the facing in fixed spatial relationship to one another and to the duct sidewall. In the illustrated embodiment of FIG. 1, retaining bars 26 are disposed horizontally along the top and bottom portions of the baffle, and the acoustic panels 36 are welded to the bars 26 at spot welds 27. Of course, a variety of alternative connectors may be used for constructing the linear array of acoustic panels.

In the preferred embodiment, the acoustic panels 36 are C-channel members 40 as best shown in the cross-sectional views of FIGS. 2 and 3a. U-channelled members and other variations of this form may also be used, such as the elliptical-membered configuration as shown in FIG. 3b. For ease of reference, this group will be collectively referred to as "channel members". The channel members 40 include a base wall or channel facing 44, channel sidewalls 41, 42, and inner flanges 43. The channel members are preferably disposed such that the inner flanges 43 form the inner face 20A of the baffle 20 and so are adjacent to duct sidewall 14, while the outer surfaces of the base walls 44 form the outer face 20B of baffle 20 and thereby define or border the passageway 32, the latter being schematically represented as a large double-headed arrow 32 in FIGS. 3a and 3b.

The channel members have a number of distinct design parameters, all of which affect the attenuation or insertion loss (hereinafter alternatively "IL") as well as the resonant frequency $f_n$ of the silencer 10. These parameters, some of which are shown in FIGS. 3(a, b), include:

i) the slot depth or facing depth "d" 46;

ii) the slot width or spacing distance "s" 48 between adjacent acoustic panels, which, in conjunction with the width "w" of the acoustic panel, is determinative of the facing porosity "P", i.e. the percentage ratio of open area to the total area of the baffle facing; and iii) the cavity depth "c" 50 which is usually determinative of the cavity volume "V" as typically the duct unit size is a design constraint.

A number of silencers have been constructed with various realizations of the resonator design parameters discussed above. The graphs of FIGS. 6 and 7 show the attenuation characteristics of the preferred embodiment when constructed to two different geometrical specifications, termed 24RDH/5 and 20RDH/4, in comparison to known, absorptive type low frequency acoustic silencers.

Figure 6:
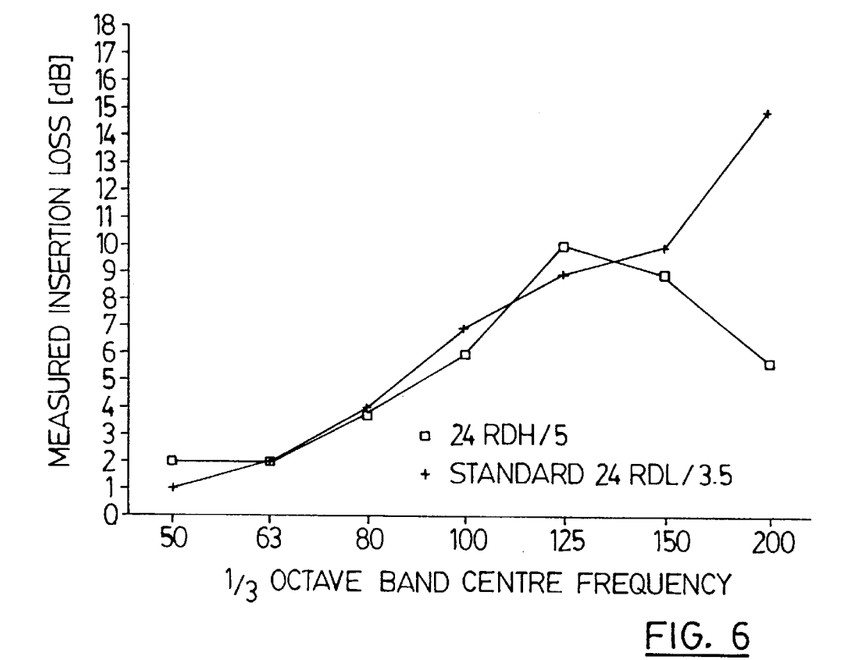
FIG. 6 is a graph illustrating attenuation characteristics for the preferred silencer constructed to a first geometrical specification in comparison with other types of silencers.

The graph for the 24RDH/5 version of the preferred embodiment is shown in FIG. 6. This version features outer dimensions of 24"×24"×60" (61×61×152 cm) and resonator parameters wherein slot depth t=1 3/16" (3 cm), cavity depth C=4 1/2" (11.4 cm), and porosity P=5.1%. The 24RDH/5 silencer employs 22 gauge (0.073 mm) sheet metal for the construction of the C-channel members 40 and the remainder of the baffle framework. For the purposes of compiling the test data, however, the casing or duct was constructed out of 10 gauge (3.4 mm) sheet metal.

In FIG. 6 the attenuation characteristic for the 24RDH/5 silencer is compared against a benchmark absorptive type silencer having the same dimensions, namely a vibron™ model 24RDL/3.5 commercially available from Vibron Ltd. of Mississauga, Ontario, Canada. As can be seen from the graph of FIG. 6, the attenuation characteristic of the 24RDH/5 version of the preferred embodiment is comparable to the insertion loss obtainable by the benchmark silencer. However, the static pressure loss for the benchmark absorptive silencer was measured to be 0.58" (1.47 cm) WG (water gauge) whereas the measured static pressure loss for the 24RDH/5 prototype was only 0.17" (0.43 cm) WG. Thus, the 24RDH/5 version of the preferred embodiment advantageously exhibits a much lower static pressure loss than the benchmark absorptive silencer thereby resulting in significant energy savings over the latter in terms of the power required for a fan driving the ventilation system. In fact, at a maximum design flow of 2500 ft/min (762 m/min) face velocity, an 83% power savings was calculated and measured for the 24RDH/5 version in comparison with the benchmark silencer.

Figure 7:
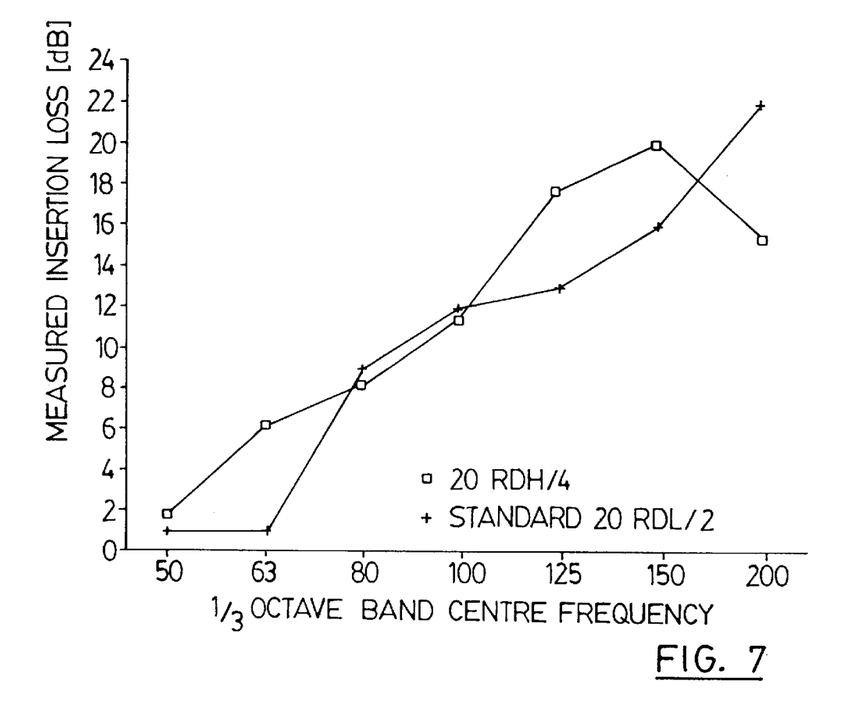
FIG. 7 is a graph illustrating attenuation characteristics for the preferred silencer constructed to a second geometrical specification in comparison with other types of silencers.

The graph for the 20RDH/4 version of the preferred embodiment is shown in FIG. 7. This version featured outer dimensions of 20"×20"×84" (51×51×213 cm) and the resonator parameters were slot depth t=2 15/16" (7.46 cm), cavity depth C=5" (12.7 cm), and porosity P=4.3%. The test version employed 22 gauge (0.073 mm) sheet metal for the construction of the baffle and the duct was constructed out of 10 gauge (3.4 mm) sheet metal, as before. The benchmark silencer in this case was a Vibron™ model 20RDL/2 having the same dimensions and duct construction. The static pressure loss for the benchmark absorptive type silencer was measured at 1.62" (4.11 cm) WG whereas the 20RDH/4 prototype only exhibited a static pressure loss of 0.43" (1.09 cm) WG. As before, the attenuation characteristics of the 20RDH/4 version of the preferred embodiment are comparable to those of the benchmark silencer, but the former advantageously exhibits a much lower static pressure than the latter. At a maximum design flow of 2500 ft/min (762 m/min) face velocity, a fan required 83% less power to drive the 20RDH/4 silencer as compared to the benchmark silencer.

The insertion loss measurements shown in FIGS. 6 and 7 were taken using an in-duct method of testing, i.e. comparison of sound levels upstream and downstream of the silencer. The reverberation room method of measuring sound attenuation was not used since the low frequency accuracy of reverberation room measurements are limited below 100 Hz.

The preferred embodiment of the silencer illustrated in FIGS. 1–3(a, b) shows acoustic panels 36 assuming the form of C-channel members 40. Alternative embodiments of the invention may employ other types acoustic panels. FIG. 4 shows an alternative embodiment of the invention wherein the acoustic panels assume the shape of rectangular cross-sectioned members 54 which may be solid (as shown) or tubular. The C-channel members 40 are the preferred acoustic panels, however, because by this construction it is possible to increase the effective volume of cavity 30 for a given slot depth 46, which parameter effects the attenuation loss and resonant frequency of the silencer.

FIG. 5 shows a further variation on the form of acoustic panel 36. In this embodiment, the acoustic panel 36 has a folded slot configuration which resembles an "L" shape. The advantage of this design is that it enables a greater effective slot depth (i.e. both legs of the "L") as compared to the straight slot of the acoustic panel shown in FIG. 3a. The (effective) slot depth has an effect on the attenuation loss and resonant frequency of the silencer. This design also advantageously allows for the same effective volume of cavity 30 as does the panel shown in FIG. 3a. Of course, more material is required to construct the embodiment of FIG. 5.

Figure 8:
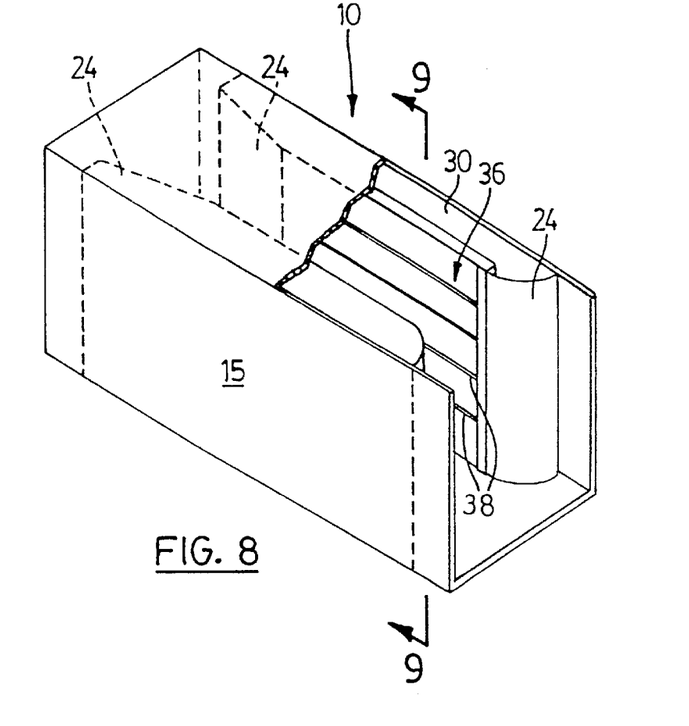
FIG. 8 is a cutaway perspective view of a silencer, taken from above, according to an alternative embodiment of the invention.
Figure 9:
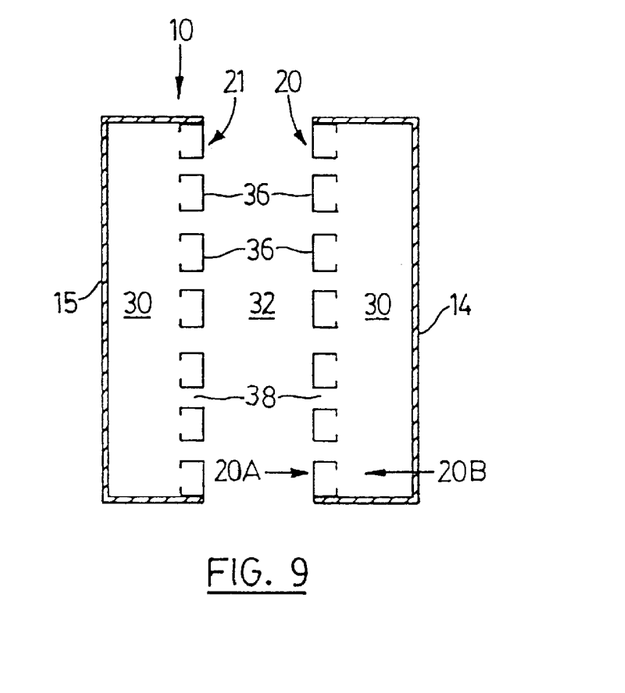
FIG. 9 is a detailed, partial cross-sectional view of the silencer of FIG. 8 taken along line 9—9 in FIG. 8.

In the embodiments of the silencer shown in FIGS. 1 to 5, the elongate slots 38 are transversely or vertically orientated so as to be substantially normal to the direction of fluid flow through passageway 32. As shown in FIGS. 8 and 9 it is also possible to construct the silencer such that the elongate slots are longitudinally or horizontally orientated so as to be substantially parallel to the direction of fluid flow through the passageway 32. Similar attenuation characteristics will be observed in the latter construction as in the former construction of the silencer.

The above described embodiments all yield good sound attenuation at low frequencies. These embodiments are reactive-type silencers which do not employ absorptive media and thus can be used in "clean rooms" and the like that can not tolerate the contamination of ventilation air flow by dust from absorptive media. Such reactive-type silencers, however, do not exhibit good high frequency sound attenuation characteristics.

Figure 10:
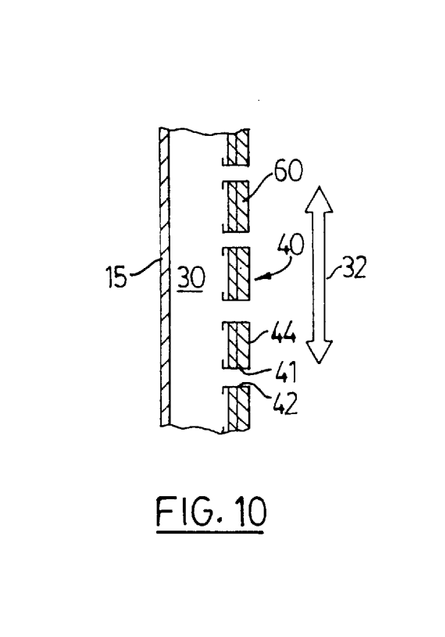
FIG. 10 is a detailed, partial cross-sectional view of an alternative embodiment of the silencer illustrating the use of absorptive media.
Figure 11:
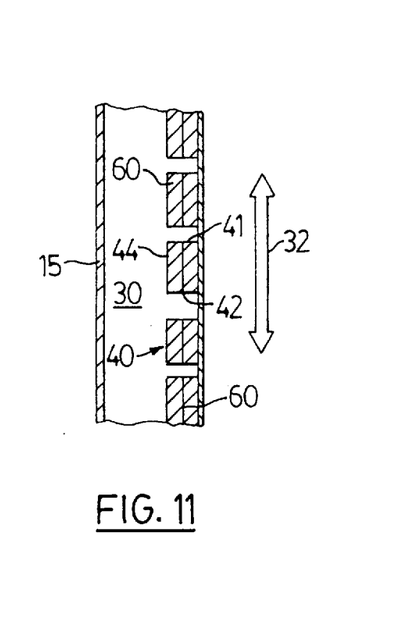
FIG. 11 is a detailed, partial cross-sectional view of another alternative embodiment of the silencer illustrating the use of absorptive media.

The above described reactive silencer in its various embodiments can readily incorporate absorptive media for mid to high frequency sound attenuation. FIG. 10 shows the channel membered-baffle having a relatively thin layer of glass fiber fill 60, such as 2" (5 cm) of 2.5 lb/ft$^3$ (40 kg/m$^3$ glass fiber, disposed in the channel of the channel member. Alternatively, FIG. 11 shows a channel membered-baffle wherein the base wall 44 of the channel member forms the inner face 20A of the baffle 20, the layer of glass fiber fill 60 being disposed in the channels, as before, with a perforated facing covering the channels and slots.

Figure 12:
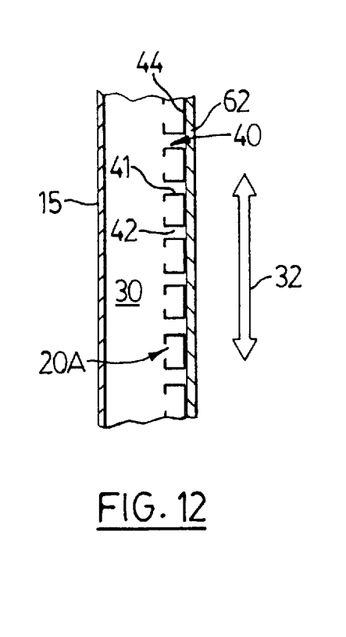
FIG. 12 is a detailed, partial cross-sectional view of yet another alternative embodiment of the silencer illustrating the use of absorptive media.
Figure 13:
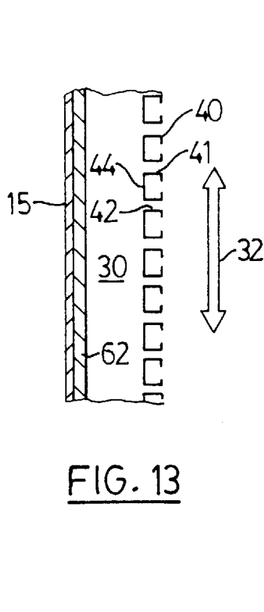
FIG. 13 is a detailed, partial cross-sectional view of still another alternative embodiment of the silencer illustrating the use of absorptive media.

As other alternatives, FIG. 12 shows a thin, i.e. ¼" (0.64 cm) to 1" (2.54 cm), glass fiber board 62 applied to the outer face 20B of baffle 20. Alternatively, this glass fiber board 62 can be applied to the inner face 20A, if desired. FIG. 13 shows the thin glass fiber board 62 being applied to side wall 15. In addition, both the glass fiber fill and glass fiber board may be employed in the reactive/absorptive silencer of the invention.

Through experimentation, it has been found that placement of absorptive media in the silencer significantly affects the low frequency attenuation characteristics thereof. Existing theoretical models of the silencer do not adequately explain this phenomenon. However, through experimentation, it has also been found that placing the thin glass fiber board 62 to the inner or outer face of the baffle, as shown in FIGS. 12 and 13, does not significantly impede the low frequency attenuation characteristics of the silencer and provides good mid to high frequency sound attenuation. It will be appreciated that, in comparison to absorptive media of comparable attenuation characteristics, the reactive/absorptive embodiments of the invention yields a lower static pressure loss to a ventilation system because only a thin absorptive media layer is required for attenuating high frequencies while low frequencies are attenuated by the reactive element of the silencer. This type of silencer can be used in facilities which can tolerate absorptive media in the ventilation system.

Figure 14:
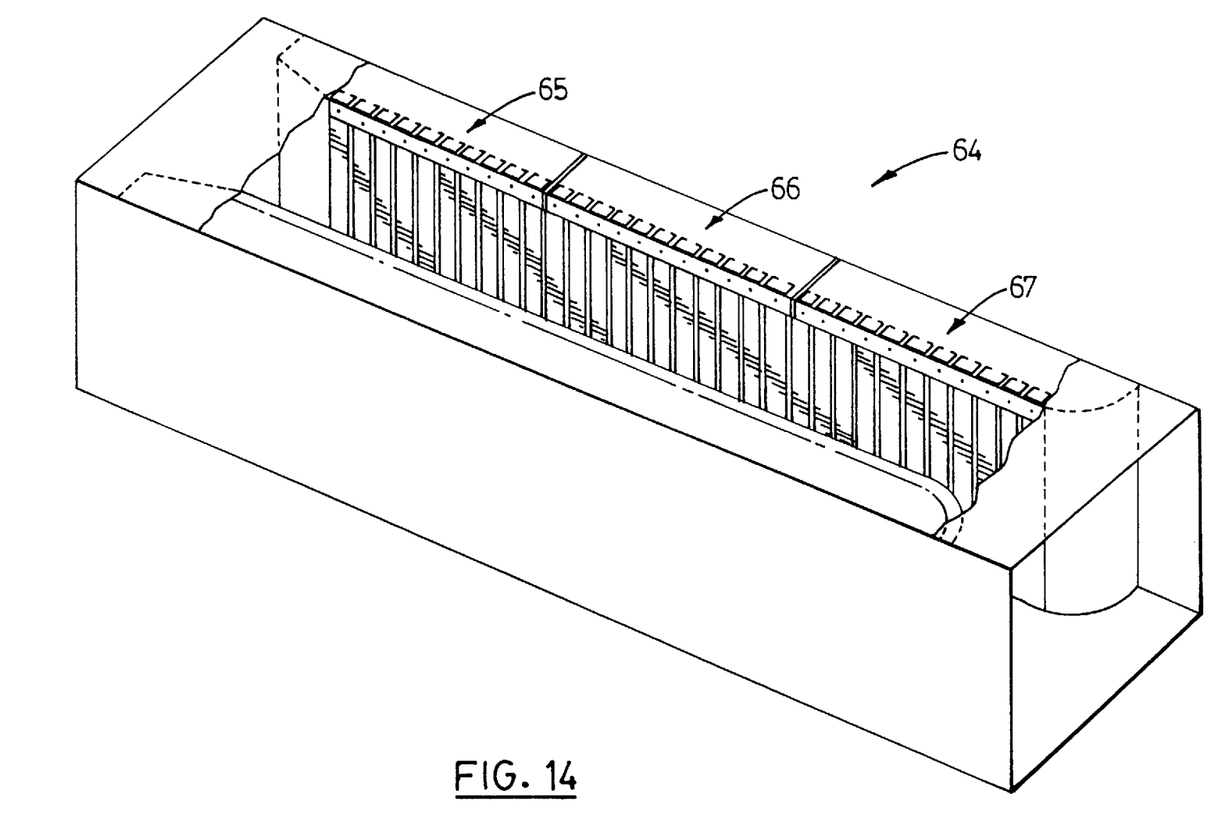
FIG. 14 is a perspective view illustration of a cascade acoustic filter constructed out of a plurality of serially connected silencers tuned to various resonant frequencies.

Given the above described resonator design parameters, it is possible to tune the silencer to a particular resonant or natural frequency $f_n$. Moreover, a plurality of silencers, each tuned to a different $f_n$, may be combined in serial fashion to produce a cascade silencer having a relatively flat yet high attenuation level across a wide, low frequency band. FIG. 17 shows, such a cascade filter, comprised of silencers 65, 66 and 67 which are connected serially and tuned to various or different resonator frequencies. In addition, the cavity depth C on each baffle 20, 21 can be of unequal depths to yield different resonant frequencies and thereby broaden the insertion loss spectrum.

Figure 15:
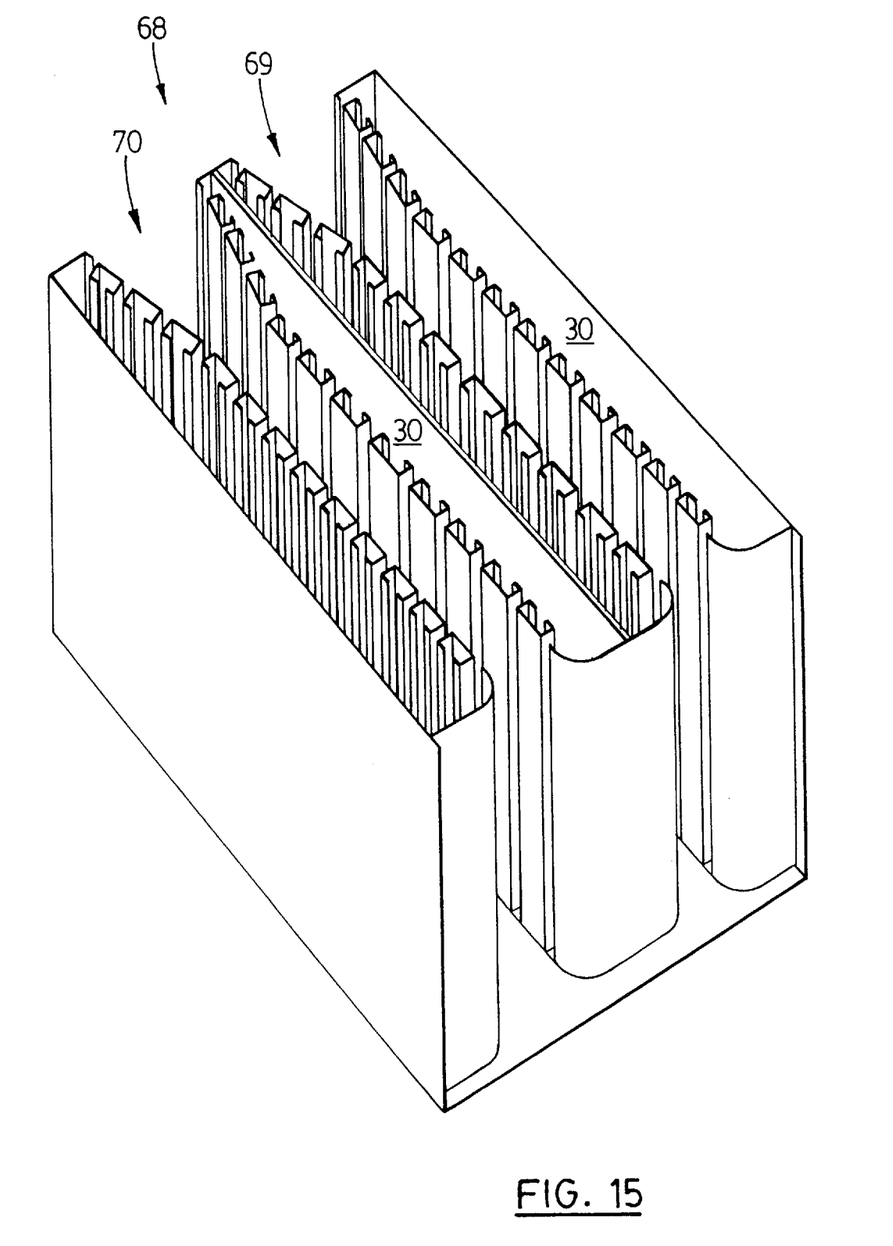
FIG. 15 is a perspective view illustration of a parallel acoustic filter constructed out of a plurality of parallelly connected silencers tuned to various resonant frequencies.

FIG. 15 shows a parallel acoustic filter 68 constructed out of a plurality of silencers, 69, 70 connected in parallel. Each of silencers 69 and 70 can be tuned to different natural frequencies.

The present invention has been described with a certain degree of particularity, but it should be understood that various alterations and modifications may be made without departing from the spirit or scope of the invention as hereinafter claimed.

What is claimed is:
1. An acoustic silencer for use in a duct having opposed, upstanding sidewalls, comprising:
a pair of opposed sidewall baffles, each baffle being located adjacent to one of the duct sidewalls, each baffle including a planar center wall portion disposed generally parallel to and spaced from the duct sidewall adjacent thereto, each baffle including end portions for connection to the adjacent sidewall such that a cavity is defined between the center wall portion and the adjacent duct sidewall, the opposed baffles defining therebetween a passageway in the duct for the flow of a fluid medium therethrough,
wherein said center wall portion of each baffle includes a plurality of generally parallel and substantially uniformly spaced apart slots, each slot spanning the breadth of the center wall portion, the slots collectively providing a porosity in the range of about 1% to 10% of the total area of the center wall portion.

2. A silencer according to claim 1 wherein said slots are orientated substantially normal to the direction of fluid flow through the passageway.

3. A silencer according to claim 1 wherein said slots are orientated substantially parallel to the direction of fluid flow through the passageway.

4. A silencer according to claim 1 wherein the height of the center wall portion is approximately equal to the height of the duct sidewall.

5. A silencer according to claim 1 wherein the effective depth of said cavity is in the range of approximately 2" (5 cm) to 12" (30 cm).

6. A silencer according to claim 1 wherein the slot depth is in the range of approximately 0.030" (0.76 mm) to 4" (10 cm).

7. A sound filter, comprising a plurality of silencers according to claim 1 connected serially, each said silencer being tuned to a different natural frequency.

8. A sound filter, comprising a plurality of silencers according to claim 1 connected parallelly, each said silencer being tuned to a different natural frequency.

9. A silencer according to claim 1 wherein said center wall portion of each baffle comprises a linear array of distinct acoustic panels disposed side by side in close proximity to one another yet spaced apart so as to define said slots, and retaining means for retaining the panels of said array in fixed spatial relationship to one another and to the duct sidewalls.

10. A silencer according to claim 9 wherein said acoustic panels are generally U-shaped channel members each having a base wall and side walls, the side walls of the U-shaped channel members being disposed so as to extend toward the duct sidewall adjacent thereto yet being spaced apart therefrom, the base walls of the U-shaped channel members forming an outer face of the center wall portion of each baffle.

11. A silencer according to claim 10 wherein the slots define a porosity of between 4.3 and 5.1% and the slot depth is between 1³⁄₁₆" (3 cm) and 2¹⁵⁄₁₆" (7.5 cm) and the effective depth of the cavity is between 4½" (11 cm) and 5" (12.7 cm).

12. A silencer according to claim 9 wherein said acoustic panels are generally rectangularly-sectioned tubular members.

13. A silencer according to claim 10 wherein the side walls of said U-shaped channel members includes flanges disposed substantially along the peripheries of the sidewalls, the flanges being orientated generally parallel to said base wall of the U-shaped channel member.

14. A silencer according to claim 13 wherein adjacent channel member sidewalls and flanges from adjacent acoustic panels are disposed to form a folded slot configuration.

15. A silencer according to claim 1 wherein the baffle includes a relatively thin glass fiber board substantially covering a face of the baffle thereby providing mid to high frequency sound attenuation capability to the silencer.

16. The silencer according to claim 10 wherein said acoustic panels include channel members each having a base wall, sidewalls, and inner flanges, the base wall forming an outer face of the center wall portion, the sidewalls and inner flanges from adjacent acoustic panels defining said slots.

17. The silencer according to claim 16 wherein adjacent channel member sidewalls and flanges from adjacent acoustic panels are disposed to form an L-shaped slot configuration.

* * * * *